United States Patent
Kotrba et al.

(10) Patent No.: US 7,845,166 B2
(45) Date of Patent: Dec. 7, 2010

(54) EXHAUST SYSTEM WITH PLURAL EMISSION TREATMENT DEVICES

(75) Inventors: Adam J. Kotrba, Laingsburg, MI (US);
Fabrizio C. Rinaldi, Jackson, MI (US);
Scott Martin, Grass Lake, MI (US);
Lawrence Dalimonte, Bath, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 616 days.

(21) Appl. No.: 11/862,241

(22) Filed: Sep. 27, 2007

(65) Prior Publication Data

US 2009/0084093 A1    Apr. 2, 2009

(51) Int. Cl.
*F01N 3/10* (2006.01)

(52) U.S. Cl. .............. 60/301; 60/295; 60/297; 60/302; 60/303; 60/311

(58) Field of Classification Search .............. 60/295, 60/297, 299, 301, 302, 303, 311
See application file for complete search history.

(56) References Cited

U.S. PATENT DOCUMENTS

| | | | | |
|---|---|---|---|---|
| 3,791,144 A | * | 2/1974 | Lang | 60/278 |
| 4,215,541 A | * | 8/1980 | Tanaka et al. | 60/284 |
| 4,887,427 A | * | 12/1989 | Shinzawa et al. | 60/286 |
| 5,239,826 A | * | 8/1993 | Hirota et al. | 60/302 |
| 5,398,504 A | * | 3/1995 | Hirota et al. | 60/302 |
| 5,950,423 A | * | 9/1999 | Hampton | 60/274 |
| 6,334,306 B1 | * | 1/2002 | Mori et al. | 60/297 |
| 6,488,076 B1 | | 12/2002 | Yasuda et al. | |
| 6,976,353 B2 | | 12/2005 | Daniel et al. | |
| 7,478,528 B2 | * | 1/2009 | Ament et al. | 60/295 |
| 2006/0213187 A1 | | 9/2006 | Kupe et al. | |
| 2006/0234174 A1 | | 10/2006 | Burrahm et al. | |

* cited by examiner

*Primary Examiner*—Binh Q. Tran
(74) *Attorney, Agent, or Firm*—Harness, Dickey & Pierce, P.L.C.

(57) ABSTRACT

An exhaust system for an engine with a plurality of combustion chambers. The exhaust system includes a first emission treatment device in fluid communication with at least one of the combustion chambers so as to receive exhaust therefrom. The exhaust system further includes a second emission treatment device in fluid communication with at least one other of the combustion chambers so as to receive exhaust therefrom. The second emission treatment device is also in fluid communication with a downstream end of the first emission treatment device so as to receive exhaust therefrom.

15 Claims, 2 Drawing Sheets

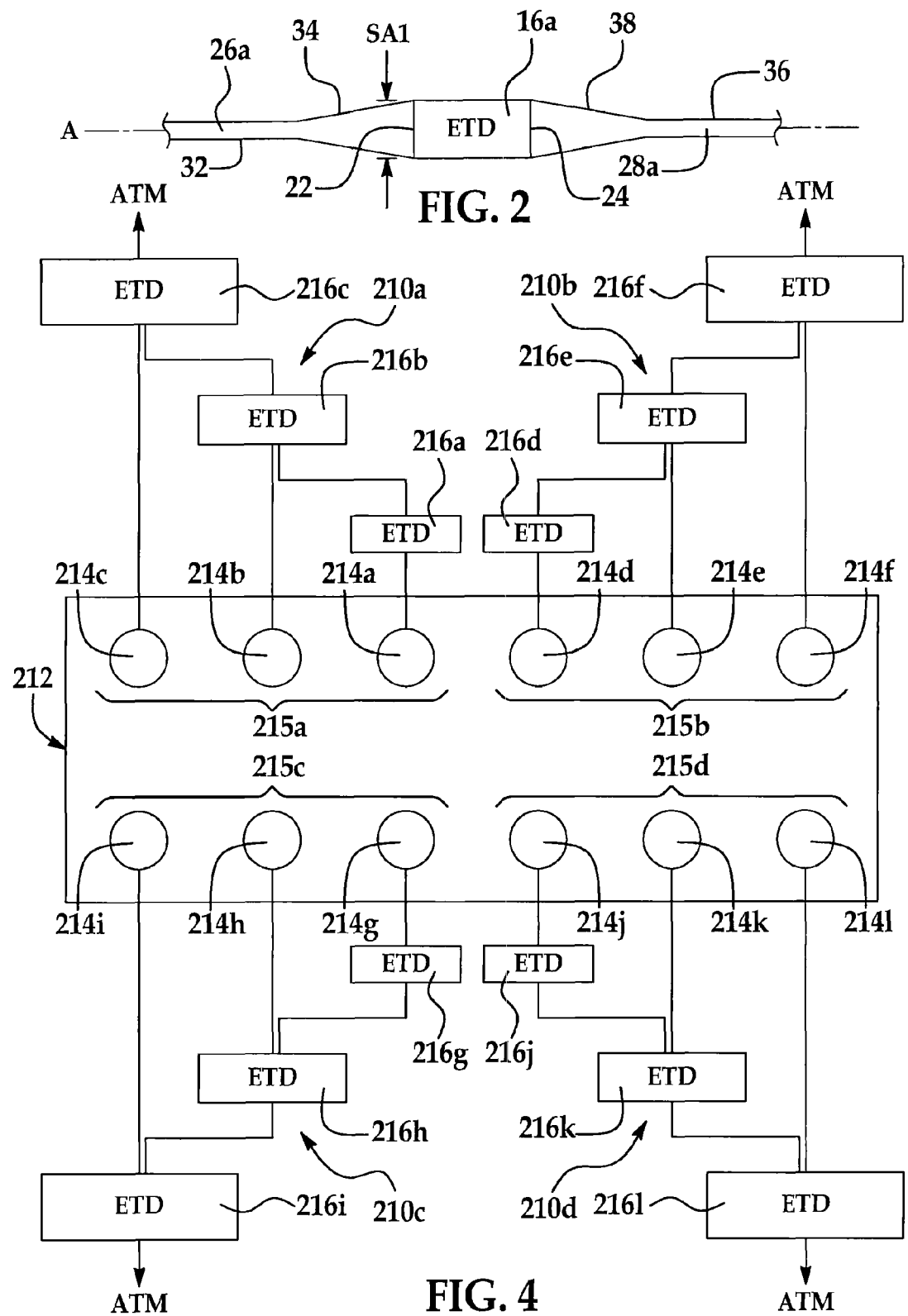

EXHAUST SYSTEM WITH PLURAL EMISSION TREATMENT DEVICES

FIELD

The present disclosure relates to an exhaust system and, more particularly, relates to an exhaust system with plural emission treatment devices.

BACKGROUND

The statements in this section merely provide background information related to the present disclosure and may not constitute prior art.

It is known to provide an exhaust system for an engine with an emission treatment device. For instance, an engine may include an exhaust system equipped with a diesel particulate filter ("DPF"), a diesel oxidation catalyst ("DOC"), a selective catalytic reduction ("SCR") device, and/or a three way catalyst ("TWC"). These emission treatment devices reduce the amount of undesirable materials flowing with the exhaust gases.

More specifically, a diesel particulate filter typically receives exhaust flowing from the combustion chambers of the engine and collects soot contained therein. Periodically, the diesel particulate filter undergoes a process called regeneration to reduce and remove the collected soot. Regeneration can be performed passively (with a catalyst that is added to the filter) or actively (by controlling the engine to increase exhaust temperature, using a fuel burner to increase the exhaust temperature, injecting fuel into the exhaust stream, etc.).

Typically, the engine includes a plurality of combustion chambers, and exhaust from each chamber flows into a manifold, which directs flow of the combined exhaust gases into a single exhaust treatment device. However, in this configuration, a significant amount of input energy is needed to increase exhaust temperature. Also, a relatively large exhaust treatment device is needed, and as such, it may be difficult to provide adequate space within the vehicle for the exhaust treatment device.

In another configuration, the exhaust system includes a plurality of exhaust treatment devices. Each exhaust treatment device is fluidly coupled to a separate combustion chamber. As such, exhaust gas from each combustion chamber flows separately to a different exhaust treatment device. However, this type of system is relatively complex, includes a substantial number of components, and can be relatively expensive.

SUMMARY

An exhaust system for an engine with a plurality of combustion chambers includes a first emission treatment device in fluid communication with at least one of the combustion chambers so as to receive exhaust therefrom. The exhaust system further includes a second emission treatment device in fluid communication with at least one other of the combustion chambers so as to receive exhaust therefrom. The second emission treatment device is also in fluid communication with a downstream end of the first emission treatment device so as to receive exhaust therefrom.

Also, an exhaust system for an engine with a plurality of combustion chambers includes a first emission treatment device having an upstream end and a downstream end. Furthermore, the exhaust system includes a second emission treatment device having an upstream end and a downstream end. Additionally, the exhaust system includes a first exhaust passage in fluid communication with at least one of the combustion chambers and the upstream end of the first emission treatment device. Moreover, the exhaust system includes a second exhaust passage in fluid communication with at least one other of the combustion chambers and the upstream end of the second emission treatment device. An intermediate passage is in fluid communication with the downstream end of the first emission treatment device and the upstream end of the second emission treatment device such that the second emission treatment device receives exhaust from the first emission treatment device and the at least one other of the combustion chambers.

In addition, an exhaust system for an engine with a plurality of combustion chambers arranged in a first group and a second group includes a first group of emission treatment devices having a first emission treatment device in fluid communication with at least one of the combustion chambers of the first group so as to receive exhaust therefrom, and a second emission treatment device in fluid communication with at least one other of the combustion chambers of the first group so as to receive exhaust therefrom. The second emission treatment device is also in fluid communication with a downstream end of the first emission treatment device so as to receive exhaust therefrom. The exhaust system additionally includes a second group of emission treatment devices having a third emission treatment device in fluid communication with at least one of the combustion chambers of the second group so as to receive exhaust therefrom, and a fourth emission treatment device in fluid communication with at least one other of the combustion chambers of the second group so as to receive exhaust therefrom. The fourth emission treatment device is also in fluid communication with a downstream end of the third emission treatment device so as to receive exhaust therefrom.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a schematic cross sectional view of a exhaust treatment device of the exhaust system of FIG. 1;

FIG. 4 is a schematic view of another embodiment of the exhaust system.

DETAILED DESCRIPTION

Figure 1:
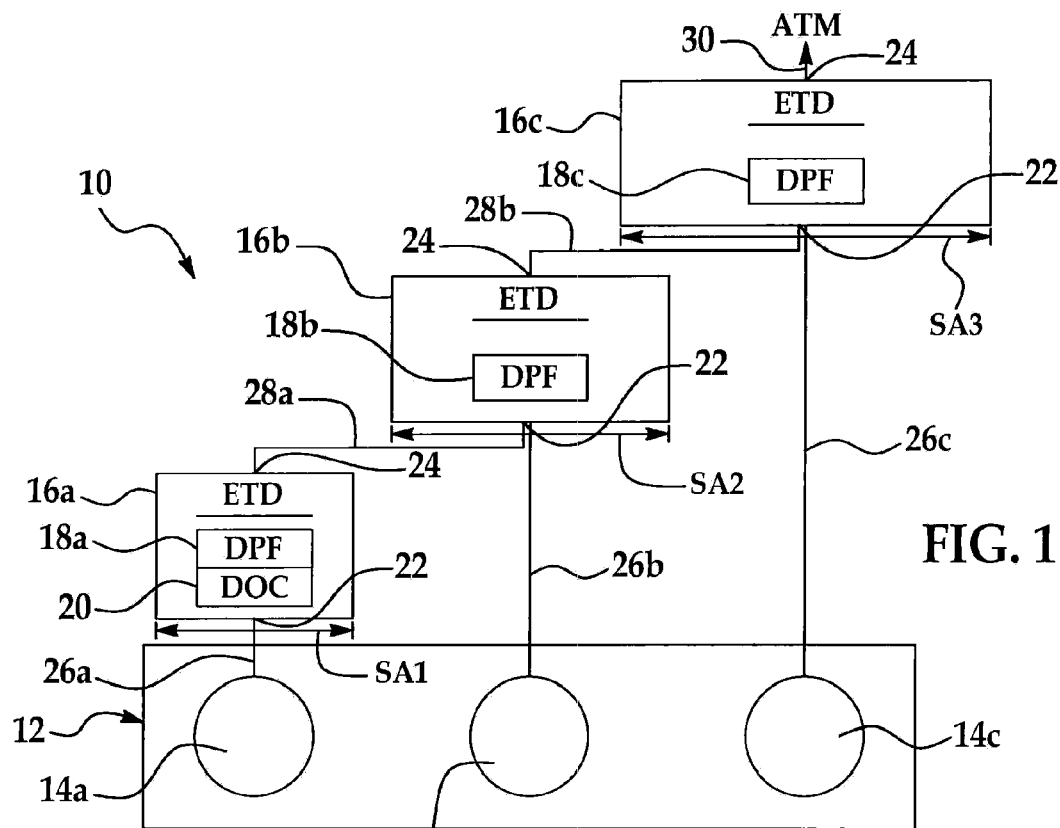
FIG. 1 is a schematic view of one embodiment of an exhaust system.

The following description is merely exemplary in nature and is not intended to limit the present disclosure, application, or uses. It should be understood that throughout the drawings, corresponding reference numerals indicate like or corresponding parts and features.

Referring initially to FIG. 1 an exhaust system 10 for an engine 12 is shown. The exhaust system 10 and engine 12 are mounted to a vehicle. The engine 12 generates torque to move the vehicle. As will be described in greater detail below, the exhaust system 10 receives exhaust from the engine 12 and treats the exhaust before it flows to the outside atmosphere (represented as "ATM" in FIG. 1).

The engine 12 includes a plurality of combustion chambers 14a, 14b, 14c. In the embodiment shown, the engine 12 includes a first combustion chamber 14a, a second combustion chamber 14b, and a third combustion chamber 14c. However, it will be appreciated that the engine 12 could include any number of combustion chambers 14a, 14b, 14c without departing from the scope of the present disclosure.

In one embodiment, the engine 12 is a diesel engine; however, it will be appreciated that the engine 12 could be of any suitable type without departing from the scope of the present disclosure. During operation, a fuel/air mixture is introduced into the combustion chambers 14a, 14b, 14c, and the fuel/air mixture ignites, which drives a piston (not shown) to thereby drive an output shaft. Rotation of the output shaft ultimately drives one or more wheels (not shown) to thereby move the vehicle. Exhaust gas, soot, particulate and other materials (collectively referred to as "exhaust"), is a product of the combustion within the combustion chambers 14a, 14b, 14c, and the exhaust flows through the exhaust system 10, which treats the exhaust before it flows to the outside atmosphere.

As shown in FIG. 1, the exhaust system 10 includes a plurality of exhaust treatment devices 16a, 16b, 16c (hereinafter "ETD"). In the embodiment shown, the exhaust system 10 includes a first ETD 16a, a second ETD 16b, and a third ETD 16c.

It will be appreciated that the first, second, and third ETDs 16a, 16b, 16c could include any suitable device operable for decreasing undesirable matter in the exhaust before the exhaust flows to the outside atmosphere. For instance, in one embodiment, the ETDs 16a, 16b, 16c include a diesel particulate filter (hereinafter "DPF"), a diesel oxidation catalyst (hereinafter "DOC"), a selective catalytic reduction device (hereinafter "SCR" device), a three way catalyst (hereinafter "TWC"), and an ignition burner. In the embodiment shown, for instance, the first ETD 16a includes a DPF 18a and a DOC 20. The DPF 18a of the first ETD 16a collects soot as the exhaust flows through the DPF 18a, and the DPF 18a undergoes regeneration in order to reduce the soot. The DOC 20 of the first ETD 16a is a catalyst operable for activating regeneration of the DPF 18a. Furthermore, the second ETD 16b includes a DPF 18b, and the third ETD 16c includes a DPF 18c.

Generally, the first ETD 16a is in fluid communication with at least one of the combustion chambers 14a, 14b, 14c so as to receive exhaust therefrom. Also, the second ETD 16b is in fluid communication with at least one other combustion chamber 14a, 14b, 14c so as to receive exhaust therefrom, and the second ETD 16b is also in fluid communication with the first ETD 16b so as to receive exhaust therefrom. Furthermore, the third ETD 16c is in fluid communication with at least one other combustion chamber 14, 14b, 14c so as to receive exhaust therefrom, the third ETD 16c is in fluid communication with the second ETD 16b and the first ETD 16a so as to receive exhaust from each. As such, the exhaust system 10 is more efficient, the exhaust system 10 is less complex than prior systems, the exhaust system 10 is less expensive than prior systems, and placement of the components of the exhaust system 10 within the vehicle is more variable that prior systems.

More specifically, each ETD 16a, 16b, 16c includes an upstream end 22 and a downstream end 24. The exhaust system 10 also includes a first exhaust passage 26a in fluid communication with at least one of the combustion chambers 14a, 14b, 14c and the upstream end 22 of the first ETD 16a. Furthermore, the exhaust system 10 includes a second exhaust passage 26b in fluid communication with at least one other of the combustion chambers 14a, 14b, 14c and the upstream end 22 of the second ETD 16b. Still further, the exhaust system 10 includes a third exhaust passage 26c in fluid communication with at least one other of the combustion chambers 14a, 14b, 14c and the upstream end 22 of the third ETD 16c. In the embodiment shown, for instance, the first exhaust passage 26a is in fluid communication the first combustion chamber 14a and the upstream end 22 of the first ETD 16a, the second exhaust passage 26b is in fluid communication the second combustion chamber 14b and the upstream end 22 of the second ETD 16b, and the third exhaust passage 26c is in fluid communication the third combustion chamber 14c and the upstream end 22 of the third ETD 16c.

Moreover, the exhaust system 10 includes a first intermediate passage 28a in fluid communication with the downstream end 24 of the first ETD 16a and the upstream end of the second ETD 16b. The exhaust system 10 additionally includes a second intermediate passage 28b in fluid communication with the downstream end 24 of the second ETD 16b and the upstream end of the third ETD 16c. Furthermore, the exhaust system 10 includes a tailpipe 30 that is in fluid communication with the downstream end 24 of the third ETD 16c.

It will be appreciated that the first intermediate passage 28a and the second exhaust passage 26b can be fluidly coupled to the second ETD 16b in any suitable manner. For instance, the first intermediate passage 28a and second exhaust passage 26b can be separately coupled to the second ETD 16b. In another embodiment, the first intermediate passage 28a and the second exhaust passage 26b are coupled to a manifold, which joins the respective exhaust streams and directs the total flow into the second ETD 16b. Likewise, the second intermediate passage 28b and the third exhaust passage 26b can be fluidly coupled to the third ETD 16c separately, via a manifold, or otherwise.

FIG. 2 further illustrates the interconnections between components of the exhaust system 10. Specifically, FIG. 2 illustrates a portion of the first exhaust passage 26a, the first ETD 16a, and the first intermediate passage 28a; however, it will be appreciated that the other components of the exhaust system 10 are substantially similar. In the embodiment shown, the first exhaust passage 26a, the first ETD 16a, and the first intermediate passage 28a all share a common axis A; however, it will be appreciated that the axis, A, of these components could be curved.

As shown, the first exhaust passage 26a includes a pipe 32 and a transition member 34 that fluidly couples the pipe 32 and the upstream end 22 of the first ETD 16a. In one embodiment, the pipe 32 and the transition member 34 are circular in a cross section taken perpendicular to the axis, A. The pipe 32 has a substantially constant cross sectional area. The transition member 34 has a frusto-contic shape such that the transition member 34 increases in cross sectional area as it transitions from the pipe 32 to the first ETD 16a. Furthermore, the first intermediate passage includes a pipe 36 and a transition member 38 that fluidly couples the downstream end 24 of the first ETD 16a and the pipe 36. In one embodiment, the pipe 36 and the transition member 38 are circular in a cross section taken perpendicular to the axis, A, of the first intermediate passage 28a. The pipe 36 has a substantially constant cross sectional area. The transition member 38 has a frusto-contic shape such that the transition member 38 decreases in cross sectional area as it transitions from the first ETD 16a to the pipe 36.

Furthermore, the first ETD 16a defines a cross sectional area SA1 that is taken on a plane substantially perpendicular to the axis, A, of first ETD 16a. In the embodiment shown, the cross sectional area SA1 of the first ETD 16*a* is substantially constant along the axial length of the first ETD 16*a*. As shown, in FIG. 1, the second and third ETDs 16*b*, 16*c* also define a cross sectional area SA2, SA3, respectively.

During operation of the engine 12, exhaust flows from the first combustion chamber 14*a* through the first exhaust passage 26*a*, through the first ETD 16*a*, through the first intermediate passage 28*a*, through the second ETD 16*b*, through the second intermediate passage 28*b*, through the third ETD 16*c*, and through the tailpipe 30 to the atmosphere. Furthermore, exhaust from the second combustion chamber 14*b* flows through the second exhaust passage 26*b*, through the second ETD 16*b*, through the second intermediate passage 28*b*, through the third ETD 16*c*, and through the tailpipe 30 to the atmosphere. Also, exhaust flows from the third combustion chamber 14*c* through the third exhaust passage 26*c*, through the third ETD 16*c*, and through the tailpipe 30 to the atmosphere.

In the embodiment shown, the cross sectional area SA2 of the second ETD 16*b* is greater than the cross sectional area SA1 of the first ETD 16*a*, and the cross sectional area SA3 of the third ETD 16*c* is greater than the cross sectional area SA2 of the second ETD 16*b* (i.e., SA3>SA2>SA1). Thus, pressure drop across each of the ETDs 16*a*, 16*b*, 16*c* is approximately equal. More specifically, pressure drop across the second ETD 16*b* is approximately equal to that of the first ETD16*a* despite receiving exhaust from both the first and second combustion chambers 14*a*, 14*b* because the second ETD 16*b* has a larger cross sectional area SA2 than the first ETD 16*a*. Likewise, pressure drop across the third ETD 16*c* is approximately equal to the other ETDs 16*a*, 16*b* despite receiving exhaust from each of the combustion chambers 14*a*, 14*b*, 14*c* because the third ETD 16*c* has a larger cross sectional area SA3 than the first and second ETDs 16*a*, 16*b*. As such, flow through the exhaust system 10 is substantially uniform.

Thus, exhaust gas from the combustion chambers 14*a*, 14*b*, 14*c* is treated by the ETDs 16*a*, 16*b*, 16*c* such that undesirable products of combustion are reduced before being introduced to the atmosphere. Also, due to the novel configuration of the exhaust system 10, the energy (e.g., heat energy) used for regenerating the first ETD 16*a* is transferred to the second ETD 16*b* and third ETD 16*c* for regenerating the second and third ETDs 16*b*, 16*c*, and the energy used for regenerating the second ETD 16*b* is transferred to the third ETD 16*c* for regenerating the third ETD 16*c*. In other words, the energy output of regenerating the first ETD 16*a* (i.e., the upstream ETD) is employed in activating regeneration of the second and third ETDs 16*b*, 16*c* (i.e., the downstream ETDs 16*b*, 16*c*), and the energy of regenerating the second ETD 16*b* (i.e., the upstream ETD) is employed in activating regeneration of the third ETD 16*c* (i.e., the downstream ETD). Accordingly, the exhaust system 10 allows for more efficient regeneration of the ETDs 16*a*, 16*b*, 16*c* as compared to prior art exhaust systems.

Furthermore, positioning the components of the exhaust system 10 within the vehicle is easier than systems of the prior art having a single, large ETD because the individual ETDs 16*a*, 16*b*, 16*c* are smaller, distinct components. Also, the components of the exhaust system 10 including the control logic for controlling regeneration of the ETDs 16*a*, 16*b*, 16*c* are relatively simple and inexpensive to manufacture.

In one embodiment, each combustion chamber 14*a*, 14*b*, 14*c* has volume of approximately 12 liters and has an aspiration ratio of 2 peaks at 1,000 rpm, resulting in output of exhaust at approximately 900 kg/hr mass flow rate per combustion chamber 14*a*, 14*b*, 14*c*. The pipe 32 of the exhaust system 10 has a diameter of approximately six inches. The transition members 34 are conic shaped and are approximately four inches long. The ETDs 16*a*, 16*b*, 16*c* include 200 cpsi SiC bricks. The first ETD 16*a* has a diameter of approximately eight inches and is approximately ten inches in length for a volume of approximately 8.2 liters, the second ETD 16*b* has a diameter of approximately ten inches and a length of approximately twelve inches for a volume of approximately 12.5 liters, and the third ETD 16*c* has a diameter of approximately twelve inches and a length of approximately twelve inches for a volume of approximately 22.2 liters. Furthermore, the exhaust has a temperature of approximately 150° C. As such, when the ETDs are substantially soot-free, the pressure drop across the first ETD 16*a* is approximately 3.4 kPa, the pressure drop across the second ETD 16*b* is approximately 5.4 kPa, and the pressure drop across the third ETD 16*c* is approximately 6.5 kPa. Also, the ETDs 16*a*, 16*b*, 16*c* each gather approximately 66 grams of soot per hour and are regenerated hourly. As such, when the ETDs 16*a*, 16*b*, 16*c* have soot, the pressure drop across the first ETD 16*a* is approximately 18.8 kPa, the pressure drop across the second ETD 16*b* is approximately 16.4 kPa, and the pressure drop across the third ETD 16*c* is approximately 15.7 kPa. Thus, the pressure drop across each ETD 16*a*, 16*b*, 16*c* remains approximately equal during the operation of the engine 12.

Figure 3:
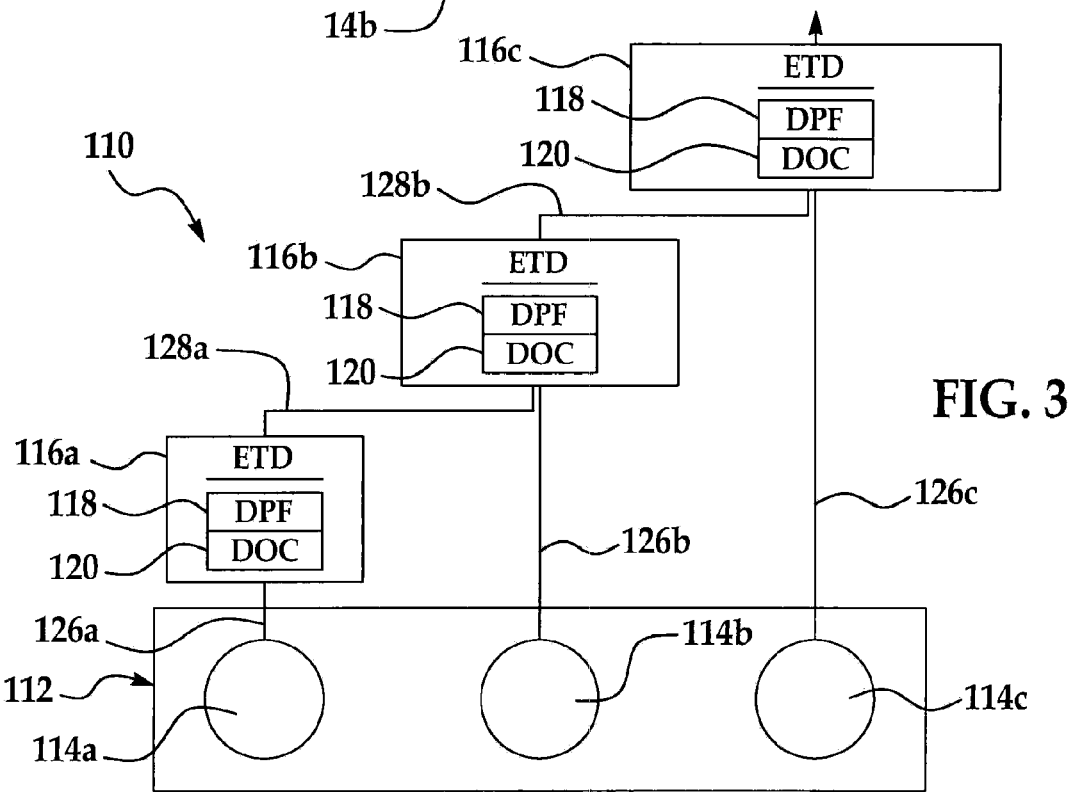
FIG. 3 is a schematic view of another embodiment of the exhaust system.

Referring now to FIG. 3, another embodiment of the exhaust system 110 is shown. The components of the exhaust system 110 are substantially similar to those of the embodiment of FIG. 1 except as noted below. Components in the embodiment of FIG. 3 are identified with corresponding reference numerals increased by 100.

In the embodiment of FIG. 3, the first, second, and third ETDs 116*a*, 116*b*, 116*c* each include a DOC 120 and a DPF 118 unlike the embodiment of FIG. 1, in which only the first ETD 16*a* includes a DOC 120 and a DPF 118. As such, in the embodiment of FIG. 3, the exhaust is treated in each ETD 116*a*, 116*b*, 116*c* by a DOC 120 and a DPF 118.

Referring now to FIG. 4, another embodiment is shown. The components of the exhaust system 210 are substantially similar to those of the embodiment of FIG. 1 except as noted below. Components in the embodiment of FIG. 4 are identified with corresponding reference numerals increased by 200.

In the embodiment of FIG. 4, the engine 212 includes twelve combustion chambers 214*a*-214*l*. Due to the increased number of combustion chambers 214*a*-214*l*, the engine 212 can be employed in a heavy duty vehicle, such as a locomotive. However, it will be appreciated that the engine 212 could be employed in any suitable vehicle without departing from the scope of the present disclosure.

The combustion chambers 214*a*-214*l* are arranged in a plurality of groups, including a first group 215*a*, a second group 215*b*, a third group 215*c*, and a fourth group 215*d*. In the embodiment shown, the first group 215*a* includes three combustion chambers 214*a*, 214*b*, 214*c* and an exhaust system 210*a* of the type shown in FIGS. 1 and 3. The second group 215*b* includes three combustion chambers 214*d*, 214*e*, 214*f* and an exhaust system 210*b* of the type shown in FIGS. 1 and 3. The third group 215*c* includes three combustion chambers 214*g*, 214*h*, 214*l* and an exhaust system 210*c* of the type shown in FIGS. 1 and 3. Furthermore, the fourth group 215*d* includes three combustion chambers 214*j*, 214*k*, 214*l* and an exhaust system 210*d* of the type shown in FIGS. 1 and 3.

As such, in the first exhaust system 210*a* exhaust gas from the combustion chamber 214*a* flows through a first ETD 216*a*, a second ETD 216*b*, and a third ETD 216*c* before being released into the atmosphere. Exhaust gas from the combustion chamber 214*b* flows through the second ETD 216*b* and the third ETD 216c before being released into the atmosphere. Furthermore, exhaust gas from the combustion chamber 214c flows through the third ETD 216c before being released into the atmosphere. Thus, like the embodiment of FIGS. 1 and 3, the exhaust system 210a allows for more efficient regeneration and reduction of undesirable materials in the exhaust, especially as compared to exhaust systems that include a single, large ETD, which receives exhaust from all combustion chambers.

Likewise, in the exhaust system 210b, exhaust from the combustion chamber 214d flows through the first ETD 216d, the second ETD 216e, and the third ETD 216f before being released into the atmosphere. Exhaust from the combustion chamber 214e flows through the second ETD 216e and the third ETD 216f before being released into the atmosphere. Exhaust gas from the combustion chamber 214f flows through the third ETD 216f before being released into the atmosphere.

In the exhaust system 210c, exhaust from the combustion chamber 214g flows through the first ETD 216g, the second ETD 216h, and the third ETD 216i before being released into the atmosphere. Exhaust from the combustion chamber 214h flows through the second ETD 216h and the third ETD 216i before being released into the atmosphere. Exhaust from the combustion chamber 214i flows through the third ETD 216i before being released into the atmosphere.

Furthermore, in the exhaust system 210d, exhaust from the combustion chamber 214j flows through the first ETD 216j, the second ETD 216k, and the third ETD 21/1 before being released into the atmosphere. Exhaust from the combustion chamber 214k flows through the second ETD 216k and the third ETD 216l before being released into the atmosphere. Exhaust from the combustion chamber 214l flows through the third ETD 216l before being released into the atmosphere.

It will be appreciated that the ETDs 216a-216l can be fluidly coupled to one or more combustion chambers 214a-214l in any suitable fashion without departing from the scope of the present disclosure. It will also be appreciated that the exhaust systems 210a-210d can include any suitable number of ETDs 216a-216l without departing from the scope of the present disclosure.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An exhaust system for an engine with a plurality of combustion chambers comprising:
    a first emission treatment device in fluid communication with at least one of the combustion chambers so as to receive exhaust therefrom;
    a second emission treatment device in fluid communication with at least one other of the combustion chambers so as to receive exhaust therefrom, the second emission treatment device also in fluid communication with a downstream end of the first emission treatment device so as to receive exhaust therefrom; and
    a third emission treatment device in fluid communication with another of the combustion chambers so as to receive exhaust therefrom, the third emission treatment device also in fluid communication with a downstream end of the first emission treatment device and the downstream end of the second emission treatment device so as to receive exhaust therefrom.

2. The exhaust system of claim 1, wherein the first and second emission treatment devices define a cross sectional area, and wherein the cross sectional area of the second emission treatment device is greater than the cross sectional area of the first emission treatment device.

3. The exhaust system of claim 1, wherein the first and second emission treatment devices include at least one of a diesel particulate filter, a diesel oxidation catalyst, a selective catalytic reduction device, a three way catalyst, and an ignition burner.

4. The exhaust system of claim 1, wherein the first and second emission treatment devices each include a diesel oxidation catalyst and a diesel particulate filter.

5. The exhaust system of claim 2, wherein the third emission treatment device defines a cross-sectional area greater than the cross-sectional area of the second emission treatment device.

6. An exhaust system for an engine with a plurality of combustion chambers comprising:
    a first emission treatment device having an upstream end and a downstream end;
    a second emission treatment device having an upstream end and a downstream end;
    a first exhaust pathway having a first end in fluid communication with at least one of the combustion chambers and a second end in communication with the upstream end of the second emission treatment device, the first emission treatment device and the second emission treatment device being plumbed in series within the first exhaust pathway; and
    a second exhaust pathway having a first end in fluid communication with at least one other of the combustion chambers and a second end in communication with the upstream end of the second emission treatment device, the second exhaust pathway being devoid of an emission treatment device such that the second emission treatment device receives exhaust from the first emission treatment device and the at least one other of the combustion chambers.

7. The exhaust system of claim 6, wherein the first and second emission treatment devices define a cross sectional area, and wherein the cross sectional area of the second emission treatment device is greater than the cross sectional area of the first emission treatment device.

8. The exhaust system of claim 6, wherein the first and second emission treatment devices include at least one of a diesel particulate filter, a diesel oxidation catalyst, a selective catalytic reduction device, a three way catalyst, and an ignition burner.

9. The exhaust system of claim 6, wherein the first and second emission treatment devices each include a diesel oxidation catalyst and a diesel particulate filter.

10. The exhaust system of claim 6, wherein the first emission treatment device includes both a diesel oxidation catalyst and a diesel particulate filter, and wherein the second emission treatment device only includes a diesel particulate filter.

11. An exhaust system for an engine with a plurality of combustion chambers arranged in a first group and a second group, the exhaust system comprising:
    a first group of emission treatment devices including:
        a first emission treatment device in fluid communication with at least one of the combustion chambers of the first group so as to receive exhaust therefrom; and
        a second emission treatment device in fluid communication with at least one other of the combustion chambers of the first group so as to receive exhaust therefrom, the second emission treatment device also in fluid communication with a downstream end of the first emission treatment device so as to receive exhaust therefrom; and a second group of emission treatment devices including:
a third emission treatment device being out of fluid communication with combustion chambers of the first group and in fluid communication with at least one of the combustion chambers of the second group so as to receive exhaust therefrom; and
a fourth emission treatment device in fluid communication with at least one other of the combustion chambers of the second group so as to receive exhaust therefrom, the fourth emission treatment device also in fluid communication with a downstream end of the third emission treatment device so as to receive exhaust therefrom.

12. An exhaust system for an engine with a plurality of combustion chambers arranged in a first group and a second group, the exhaust system comprising:

a first group of emission treatment devices including:
a first emission treatment device in fluid communication with at least one of the combustion chambers of the first group so as to receive exhaust therefrom; and
a second emission treatment device in fluid communication with at least one other of the combustion chambers of the first group so as to receive exhaust therefrom, the second emission treatment device also in fluid communication with a downstream end of the first emission treatment device so as to receive exhaust therefrom; and a second group of emission treatment devices including:
a third emission treatment device in fluid communication with at least one of the combustion chambers of the second group so as to receive exhaust therefrom; and
a fourth emission treatment device in fluid communication with at least one other of the combustion chambers of the second group so as to receive exhaust therefrom, the fourth emission treatment device also in fluid communication with a downstream end of the third emission treatment device so as to receive exhaust therefrom, wherein the first, second, third, and fourth emission treatment devices define a cross sectional area, wherein the cross sectional area of the second emission treatment device is greater than the cross sectional area of the first emission treatment device, and wherein the cross sectional area of the fourth emission treatment device is greater than the cross sectional area of the third emission treatment device.

13. The exhaust system of claim 11, wherein the first, second, third, and fourth emission treatment devices include at least one of a diesel particulate filter, a diesel oxidation catalyst, a selective catalytic reduction device, a three way catalyst, and an ignition burner.

14. The exhaust system of claim 11, wherein the first, second, third, and fourth emission treatment devices each include a diesel oxidation catalyst and a diesel particulate filter.

15. An exhaust system for an engine with a plurality of combustion chambers arranged in a first group and a second group, the exhaust system comprising:

a first group of emission treatment devices including:
a first emission treatment device in fluid communication with at least one of the combustion chambers of the first group so as to receive exhaust therefrom; and
a second emission treatment device in fluid communication with at least one other of the combustion chambers of the first group so as to receive exhaust therefrom, the second emission treatment device also in fluid communication with a downstream end of the first emission treatment device so as to receive exhaust therefrom; and a second group of emission treatment devices including:
a third emission treatment device in fluid communication with at least one of the combustion chambers of the second group so as to receive exhaust therefrom; and
a fourth emission treatment device in fluid communication with at least one other of the combustion chambers of the second group so as to receive exhaust therefrom, the fourth emission treatment device also in fluid communication with a downstream end of the third emission treatment device so as to receive exhaust therefrom, wherein the first emission treatment device includes both a diesel oxidation catalyst and a diesel particulate filter, wherein the second emission treatment device only includes a diesel particulate filter, wherein the third emission treatment device includes both a diesel oxidation catalyst and a diesel particulate filter, and wherein the fourth emission treatment device only includes a diesel particulate filter.

* * * * *

UNITED STATES PATENT AND TRADEMARK OFFICE
CERTIFICATE OF CORRECTION

| | | |
|---|---|---|
| PATENT NO. | : 7,845,166 B2 | Page 1 of 1 |
| APPLICATION NO. | : 11/862241 | |
| DATED | : December 7, 2010 | |
| INVENTOR(S) | : Adam J. Kotrba et al. | |

It is certified that error appears in the above-identified patent and that said Letters Patent is hereby corrected as shown below:

Col. 6, line 58, "214l" should be --214i--

Col. 7, line 21, "216l" should be --216i--

Col. 7, line 29, "21/1" should be --216l--

Signed and Sealed this
Seventeenth Day of May, 2011

David J. Kappos
*Director of the United States Patent and Trademark Office*